(12) United States Patent
Sakhnini et al.

(10) Patent No.: US 12,284,594 B2
(45) Date of Patent: Apr. 22, 2025

(54) SUB-SYMBOL DISCOVERY SIGNAL

(71) Applicant: QUALCOMM Incorporated, San Diego, CA (US)

(72) Inventors: Iyab Issam Sakhnini, San Diego, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/804,543

(22) Filed: May 27, 2022

(65) Prior Publication Data

US 2023/0388900 A1  Nov. 30, 2023

(51) Int. Cl.
  *H04W 48/08* (2009.01)
  *H04L 27/26* (2006.01)
  *H04W 56/00* (2009.01)

(52) U.S. Cl.
  CPC ......... *H04W 48/08* (2013.01); *H04L 27/2605* (2013.01); *H04W 56/0015* (2013.01)

(58) Field of Classification Search
  None
  See application file for complete search history.

(56) References Cited

U.S. PATENT DOCUMENTS

| | | | |
|---|---|---|---|
| 2011/0149798 A1* | 6/2011 | Cordeiro | H04W 8/005 370/254 |
| 2015/0117435 A1* | 4/2015 | Baldemair | H04W 56/001 |
| 2021/0045144 A1* | 2/2021 | Kim | H04W 72/30 |
| 2021/0243683 A1* | 8/2021 | Harada | H04B 7/0626 |
| 2021/0258065 A1* | 8/2021 | Wang | H04W 56/001 |
| 2021/0258895 A1 | 8/2021 | Sakhnini et al. | |
| 2022/0095361 A1 | 3/2022 | Saggar et al. | |
| 2024/0163055 A1* | 5/2024 | Chen | H04W 24/02 |

OTHER PUBLICATIONS

International Search Report and Written Opinion—PCT/US2023/021996—ISA/EPO—Sep. 6, 2023.
Qualcomm Incorporated: "Initial Access Aspects for NR to Support Operation Between 52.6 GHz and 71 GHz", 3GPP TSG RAN WG1 #104b-e, R1-2103157, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177957, 18 pages, paragraph [2.1.2].

* cited by examiner

*Primary Examiner* — Noel R Beharry
*Assistant Examiner* — Angelie T Ngo
(74) *Attorney, Agent, or Firm* — Procopio, Cory, Hargreaves & Savitch LLP

(57) ABSTRACT

The apparatus, in some aspects, may be a wireless device that is configured to monitor for one or more discovery signal transmissions within a single symbol, where each discovery signal for a single beam direction spans less than a symbol in time and synchronize with a network node based on a reception of the one or more discovery signal transmissions. The apparatus, in some aspects, may be network node that is configured to generate one or more discovery signal transmissions for transmission within a single symbol, wherein each discovery signal for a single beam direction spans less than a symbol in time, and transmit the one or more discovery signal transmissions within the single symbol.

26 Claims, 15 Drawing Sheets

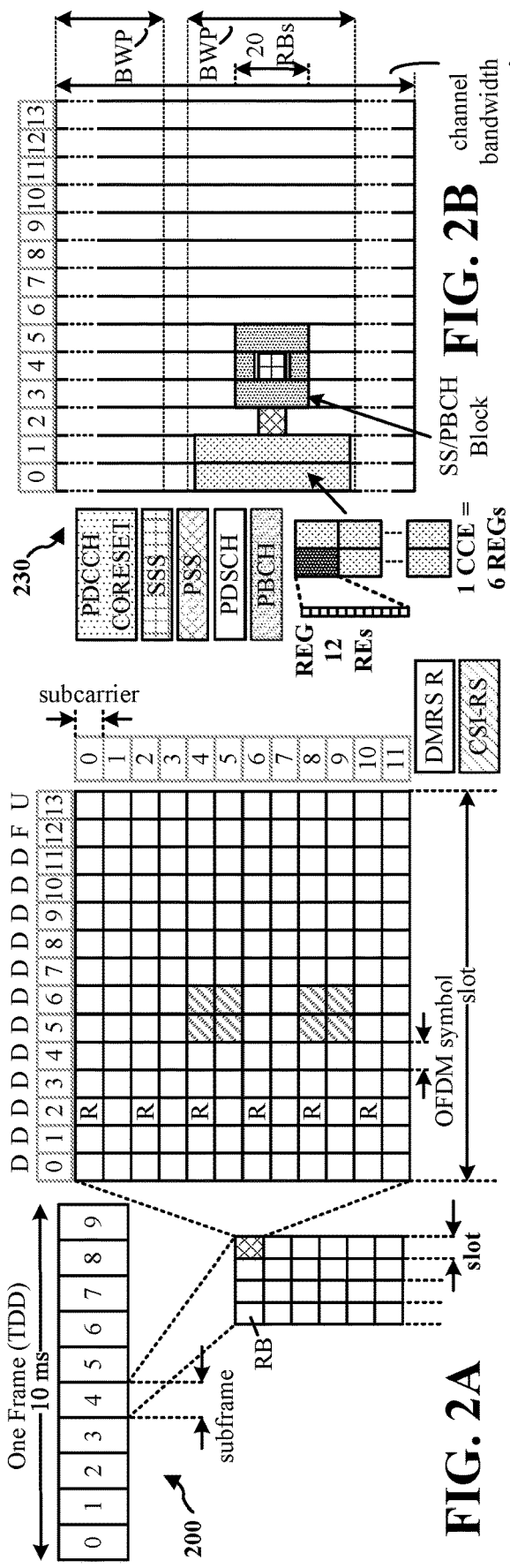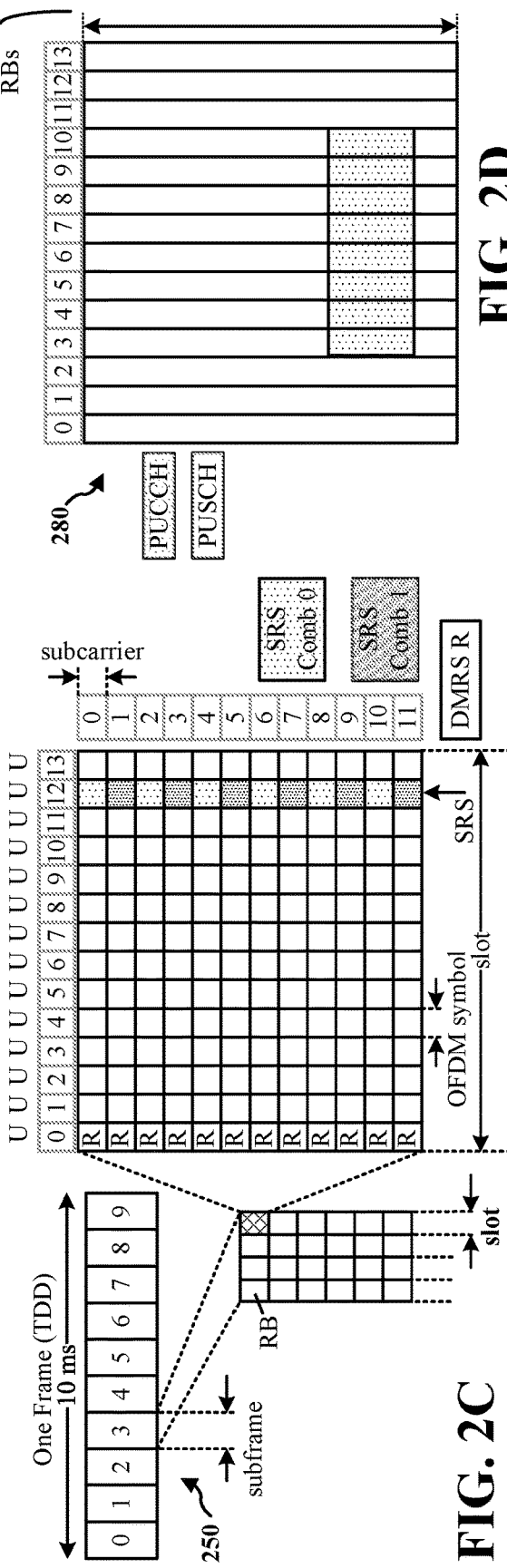
FIG. 2A  FIG. 2B  FIG. 2C  FIG. 2D

FIG. 4

SUB-SYMBOL DISCOVERY SIGNAL

TECHNICAL FIELD

The present disclosure relates generally to communication systems, and more particularly, to discovery signals for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to monitor for one or more discovery signal transmissions within a single symbol, where each discovery signal for a single beam direction spans less than a symbol in time and synchronize with a network node based on a reception of the one or more discovery signal transmissions.

In an aspect of the disclosure, a method, a computer-readable medium, and an apparatus are provided. The apparatus may be configured to generate one or more discovery signal transmissions for transmission within a single symbol, wherein each discovery signal for a single beam direction spans less than a symbol in time, and transmit the one or more discovery signal transmissions within the single symbol.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 4 illustrates possible SSB locations within a slot in some aspects of wireless communication.

DETAILED DESCRIPTION

Figure 1:
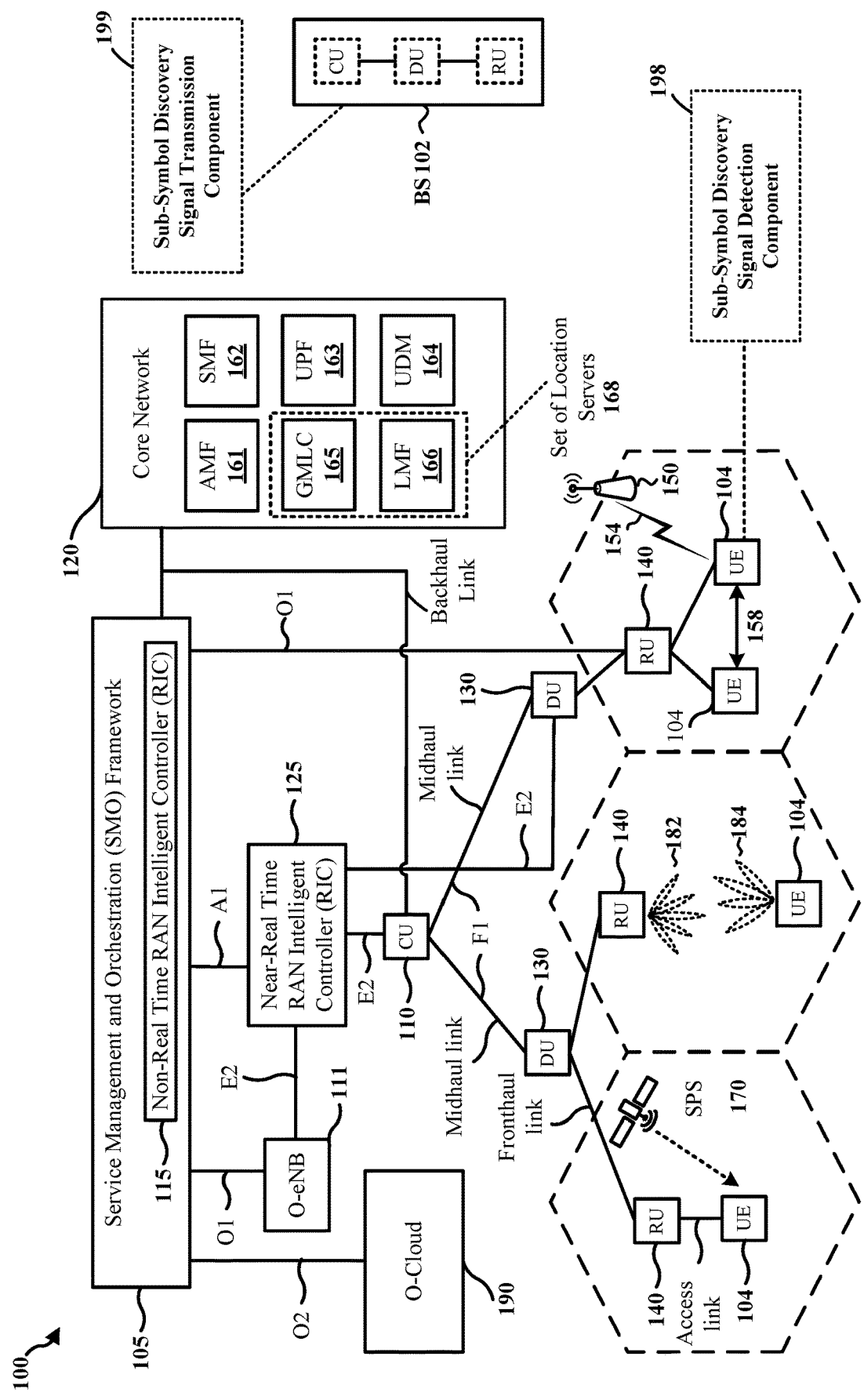
FIG. 1 is a diagram illustrating an example of a wireless communications system and an access network.

Some aspects of wireless communication use one or more SSBs for initial cell search. In some aspects, an SSB may include or span 4 symbols with 1 symbol for PSS, 2 symbols for PBCH, and 1 symbol with FDM'ed SSS and PBCH. The PSS, in some aspects, uses a length 127 frequency domain-based M-sequence (e.g., mapped to 127 sub-carriers (SCs)) with one of three possible sequences while the SSS may use a length 127 frequency domain-based Gold Code sequence (e.g., 2 M-sequences mapped to 127 SCs) with one of 1008 possible sequences. In some aspects, PBCH is QPSK modulated can be coherently demodulated using an associated DMRS. In some aspects, the SCS associated with the SSB may be one of 15 kHz, 30 kHz, 120 kHz, 240 kHz, 480, kHz, or 960 kHz.

In some aspects, different beams associated with different SSB indexes may be used by different numbers of devices. Additionally, a threshold number of devices that may be defined for switching from a standard (e.g., four-symbol) SSB to a simpler discovery signal, e.g., a keep alive signal (KAS), or set of discovery signals. For example, a first SSB and unused portions may span a first frequency range and occupy a first set of four symbols. In some aspects, a first KAS may represent a transmission of the first SSB using a larger SCS (e.g., using 480 kHz SCS instead of 120 kHz SCS) such that the number of symbols is maintained, but the time required is reduced and the full bandwidth, or nearly the full bandwidth, is utilized. While switching SCS may provide some overhead reduction, in some aspects, it introduces additional complexity. For example, additional complexity associated with an initial search may be introduced for a connecting device, a cell coverage may be reduced due to the reduced time available for a CP, and/or a beam switching gap may not be absorbed in a CP due to a short CP.

In order to reduce overhead, without introducing increased complexity, the first SSB, in some aspects, may be replaced by one or more simpler discovery signals. For example, the first SSB may be replaced by one or more first KASs or a set of a first KAS and a second KAS. The simpler discovery signals may be implemented in some aspects as described below.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a sub-symbol discovery signal detection (SSDSD) component 198 that may be configured to monitor for one or more discovery signal transmissions within a single symbol, where each discovery signal for a single beam direction spans less than a symbol in time and synchronize with a network node based on a reception of the one or more discovery signal transmissions. In certain aspects, the base station 102 may include a sub-symbol discovery signal transmission (SSDST) component 199 that may be configured to generate one or more discovery signal transmissions for transmission within a single symbol, wherein each discovery signal for a single beam direction spans less than a symbol in time, and transmit the one or more discovery signal transmissions within the single symbol. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
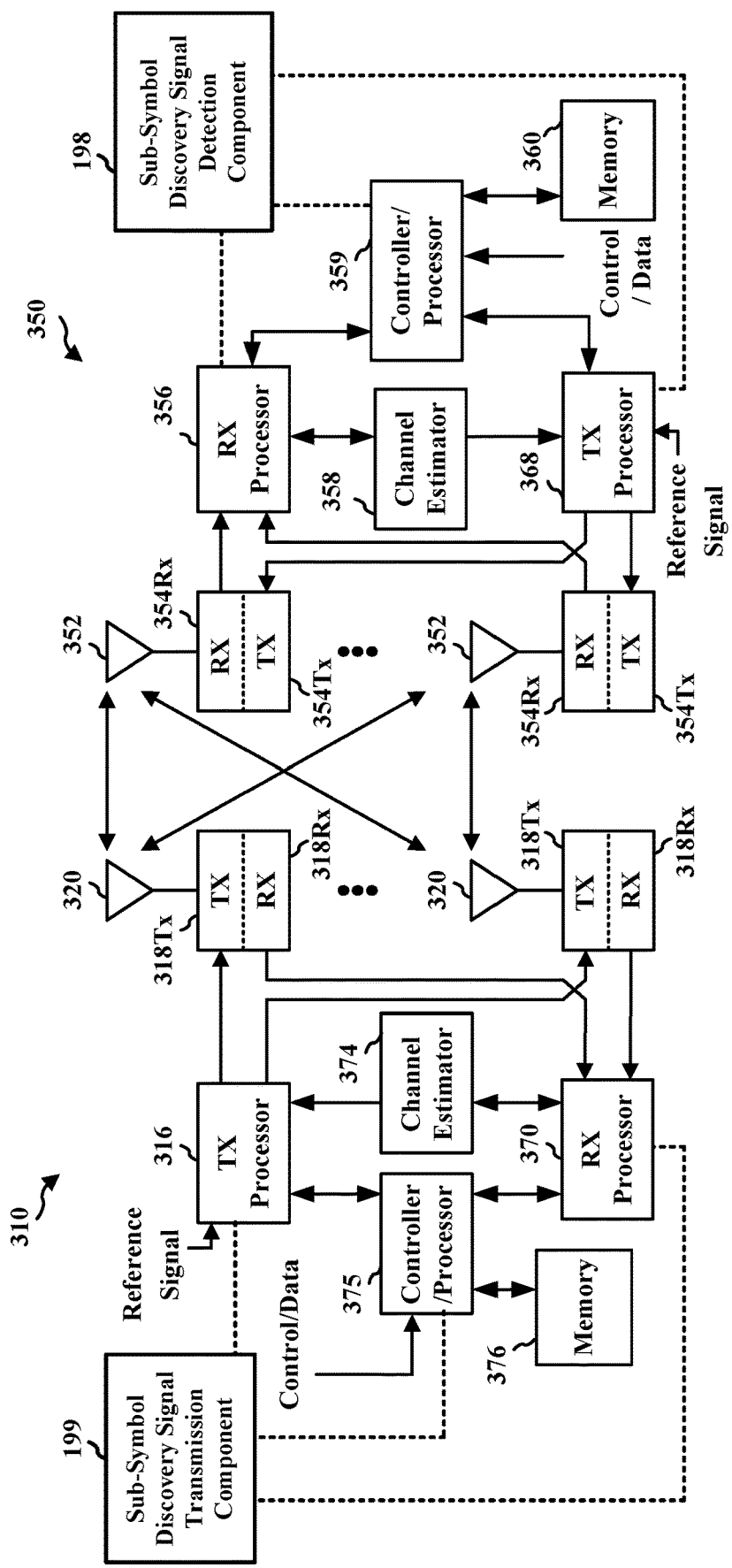
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSDSD component 198 of FIG. 1.

At least one of the TX processor 316, the RX processor 370, and the controller/processor 375 may be configured to perform aspects in connection with the SSDST component 199 of FIG. 1.

Some aspects of wireless communication use one or more SSBs for initial cell search. As described in relation to FIG. 2B, an SSB may include or span 4 symbols with 1 symbol for PSS, 2 symbols for PBCH, and 1 symbol with FDM'ed SSS and PBCH. The PSS, in some aspects, uses a length 127 frequency domain-based M-sequence (e.g., mapped to 127 sub-carriers (SCs)) with one of three possible sequences while the SSS may use a length 127 frequency domain-based Gold Code sequence (e.g., 2 M-sequences mapped to 127 SCs) with one of 1008 possible sequences. In some aspects, PBCH is QPSK modulated can be coherently demodulated using an associated DMRS. In some aspects, the SCS associated with the SSB may be one of 15 kHz, 30 kHz, 120 kHz, 240 kHz, 480, kHz, or 960 kHz.

Figure 4:
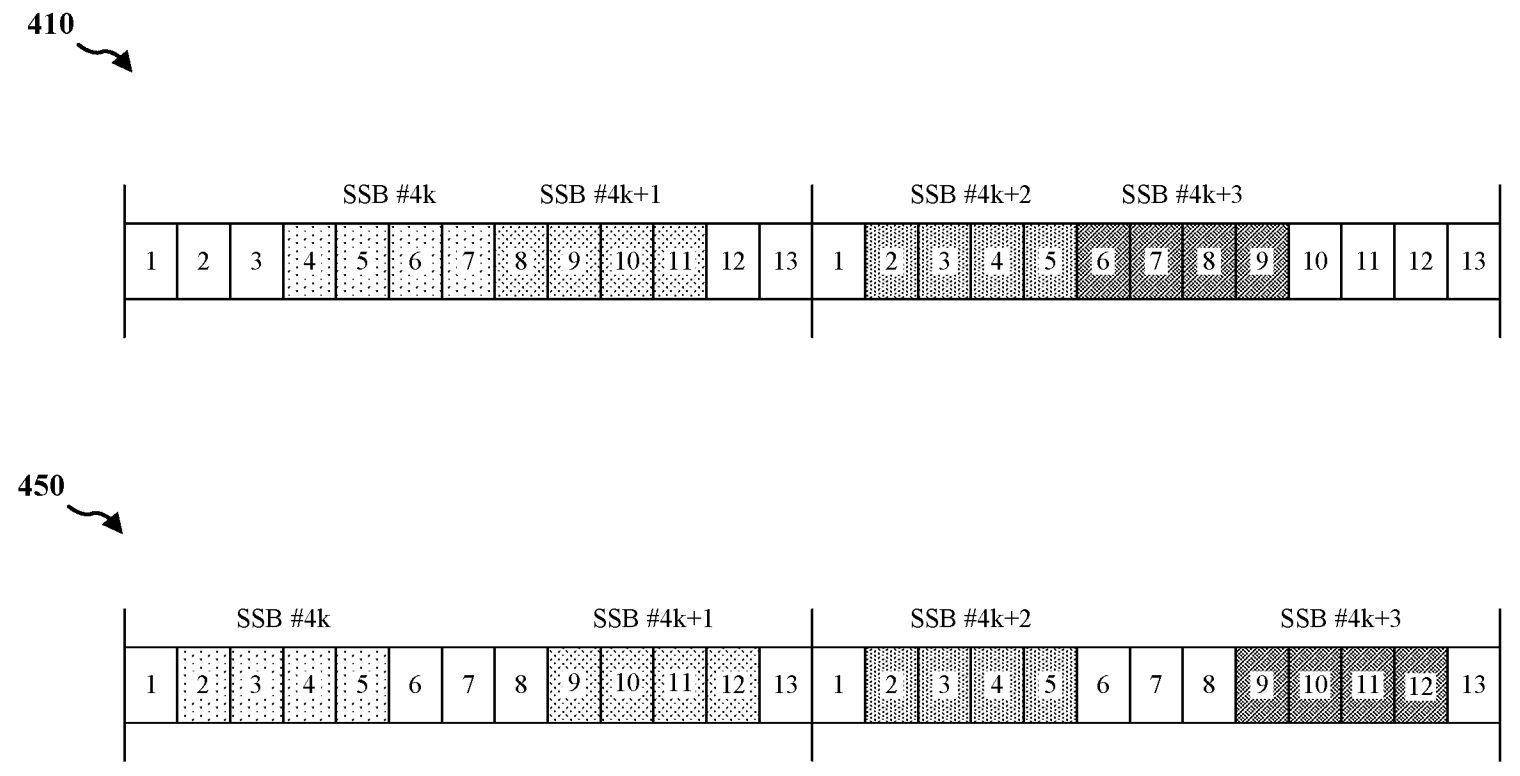

FIG. 4 illustrates possible SSB locations within a slot in some aspects of wireless communication. Diagram 410 illustrates a first pattern of candidate SSB positions (e.g., sets of four symbols) for an SCS of 120 kHz. Diagram 410 illustrates that there are two back-to-back candidate SSB positions per slot in some aspects. Diagram 450 illustrates a second pattern of candidate SSB positions for an SCS of 480 or 960 kHz. Diagram 450 illustrates that there are two candidate SSB positions per slot with a three-symbol gap between candidate SSBs. In some aspects, the gap allows for as many as two symbols for a CORESET and one symbol for a beam switching gap.

Figure 5:
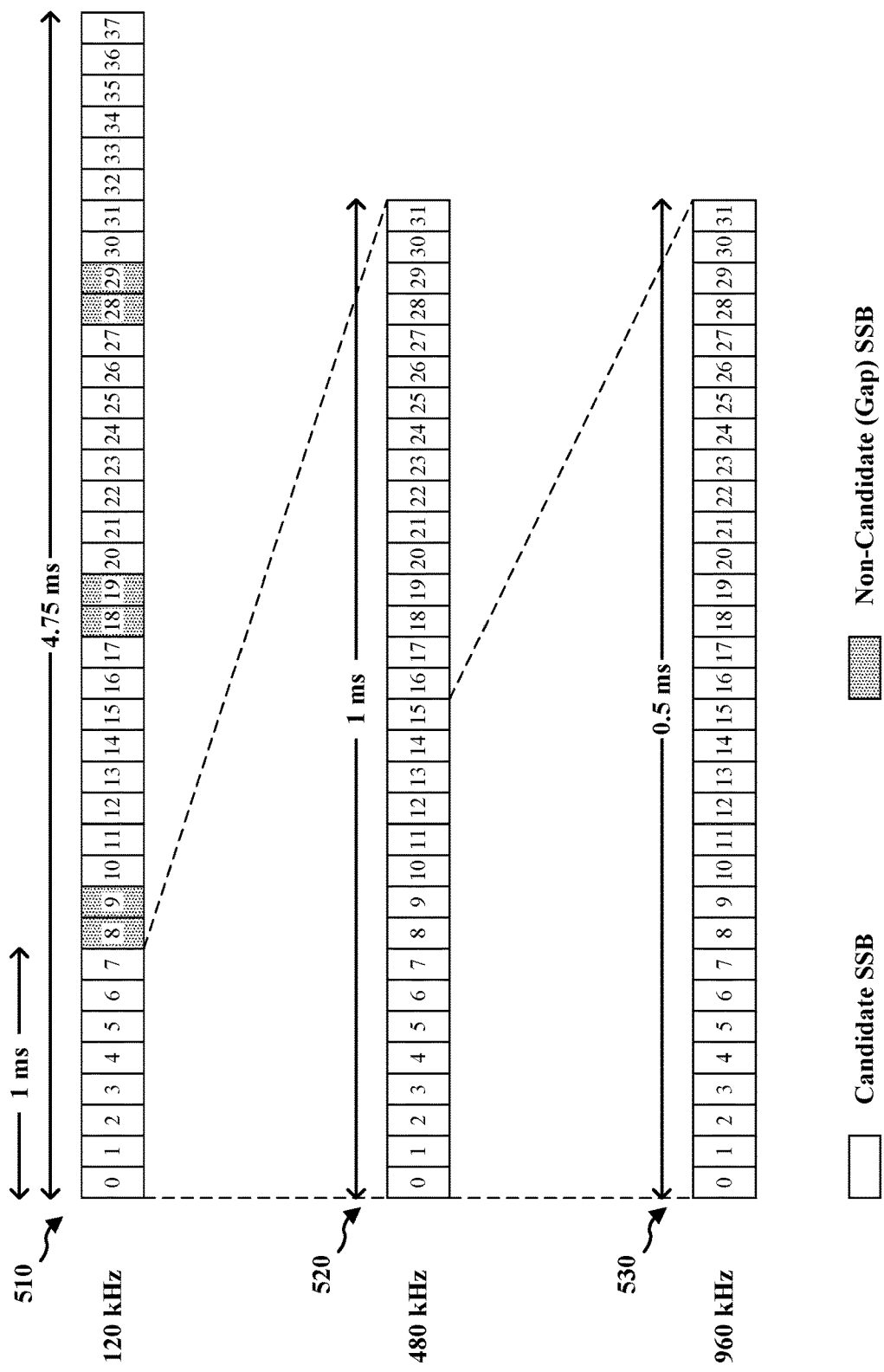
FIG. 5 illustrates slots that may be used for SSB for different sub-carrier spacings.

FIG. 5 illustrates slots that may be used for SSB for different sub-carrier spacings. For example, diagram 510 illustrates that for a SCS of 120 kHz, a pattern of slots available for SSBs may include eight slots that are available for SSBs (e.g., two SSBs per slot as illustrated in FIG. 4) followed by two slots that are not available for SSBs. Diagram 520 and diagram 530 illustrate that for a SCS of 480 kHz and/or 960 kHz, each illustrated slot may be available for (two) SSBs. In some aspects, the sets of slots available for SSBs repeats every 20 ms.

Figure 6:
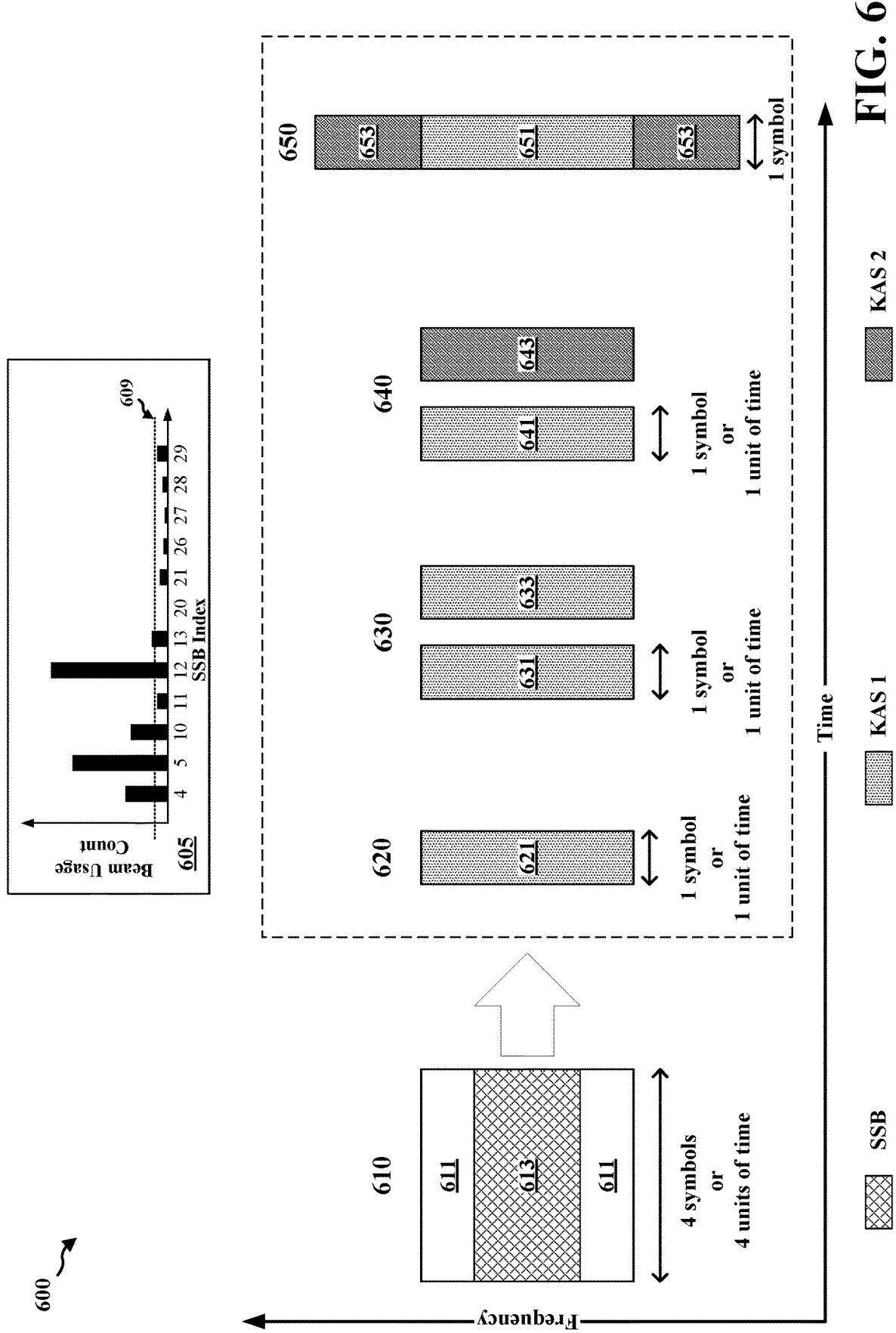
FIG. 6 is a diagram illustrating a set of signals that may be used to replace a SSB.

FIG. 6 is a diagram 600 illustrating a set of signals that may be used to replace a SSB. In some aspects, diagram 605 illustrates that different beams associated with different SSB indexes may be used by different numbers of devices. Additionally, diagram 605 illustrates a threshold number of devices 609 that may be defined for switching from a standard (e.g., four-symbol) SSB to a simpler discovery signal, e.g., a keep alive signal (KAS), or set of discovery signals. For example, diagram 610 illustrates that a first SSB 613 and unused portions 611 may occupy a first set of four symbols spanning a first frequency range. In some aspects, the first KAS 621 of diagram 620 may represent a transmission of the same SSB using a larger SCS (e.g., using 480 kHz SCS instead of 120 kHz SCS) such that the number of symbols is maintained, but the time required is reduced and the full bandwidth, or nearly the full bandwidth, is utilized. While switching SCS may provide some overhead reduction, in some aspects, it introduces additional complexity. For example, additional complexity associated with an initial search may be introduced for a connecting device, a cell coverage may be reduced due to the reduced time available for a CP, and/or a beam switching gap may not be absorbed in a CP due to a short CP.

In order to reduce overhead, without introducing increased complexity, the first SSB 613, in some aspects, may be replaced by one or more simpler discovery signals. For example, the SSB 613 may be replaced by one or more of first KAS 621 in diagram 620, first KAS 631 and first KAS 633 in diagram 630, first KAS 641 and second KAS 643 in diagram 640, first KAS 651 and second KAS 653 in diagram 650.

For example, in some aspects, the SSB 613 may be replaced for beams associated with numbers of devices below the threshold number of devices 609. The first KAS 621, 631, 633, 641, and/or 651 may include the same information as the SSB 613 by using a full bandwidth (e.g., the first frequency range) for a smaller number of symbols (e.g., one or two symbols). In some aspects, the first KAS 621, 631, 633, 641, and/or 651 and/or the second KAS 643 and/or 653 may include a downlink reference signal (DL-RS) with no or minimal information (e.g., a PSS) and/or a partial cell ID (e.g., a PSS ID). The first KAS and the second KAS, in some aspects, may include different sequences or different information. In some aspects, a first KAS 651 and a second KAS 653 may be frequency duplexed in a reduced set of symbols and an expanded frequency. The first or second KAS 621, 631, 633, 641, 643, 651, and/or 653, in some aspects, may be beam-swept within a KAS burst. In some aspects, a KAS may be transmitted using a same transmission beam(s) as is used for SSB transmission. The KAS, in some aspects, may be transmitted using broader beams than used to transmit SSBs. The KAS may be transmitted with a larger power (over a shorter time and/or with a reduced frequency) than is used to transmit the SSB, where the total power for transmitting the KAS is less than or equal to the total power for transmitting the SSB that it replaced.

Figure 7:
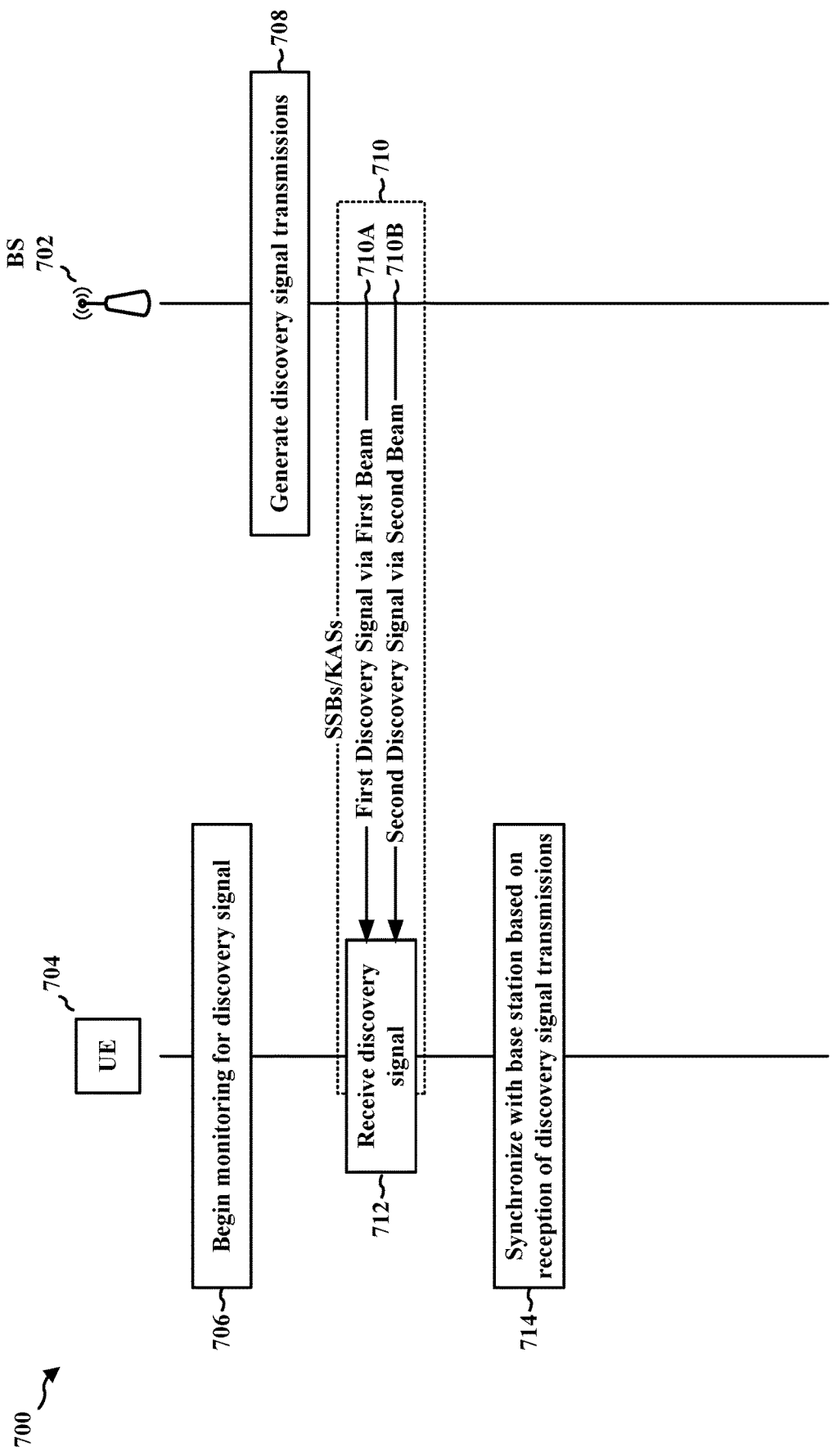
FIG. 7 is a call flow diagram for a method of wireless communication in accordance with various aspects of the present disclosure.

FIG. 7 is a call flow diagram 700 for a method of wireless communication in accordance with various aspects of the present disclosure. A UE 704 (as an example of a wireless communication device) may begin monitoring for a discovery signal at 706. The UE 704 may begin monitoring for the discovery signal at 706 based on a startup procedure. Monitoring for the discovery signal at 706 may include monitoring for one or more discovery signal transmissions within a single symbol. In some aspects, each discovery signal for a single beam direction may span less than a symbol in time.

A base station 702, in some aspects, may generate one or more discovery signal transmissions for transmission within a single symbol. In some aspects, each discovery signal may be associated with a single (unique) beam direction and may span less than a symbol in time. The one or more discovery signal transmissions, in some aspects, include a SSB, a discovery signal, or a KAS. In some aspects, the one or more discovery signal transmissions may include a first discovery signal and a second discovery signal and generating the one or more discovery signal transmissions may include adding at least one of a first cyclic prefix or a first time gap in the symbol before the first discovery signal, and adding at least one of a second cyclic prefix or a second time gap in the symbol before the second discovery signal. In some aspects, the first cyclic prefix and the second cyclic prefix are added before a DFT is applied to the one or more discovery signals. The first cyclic prefix and the second cyclic prefix, in some aspects, are added after an IFFT to the one or more discovery signals. In some aspects, the base station may precode at least one of the first discovery signal and the second discovery signal.

Figure 8:
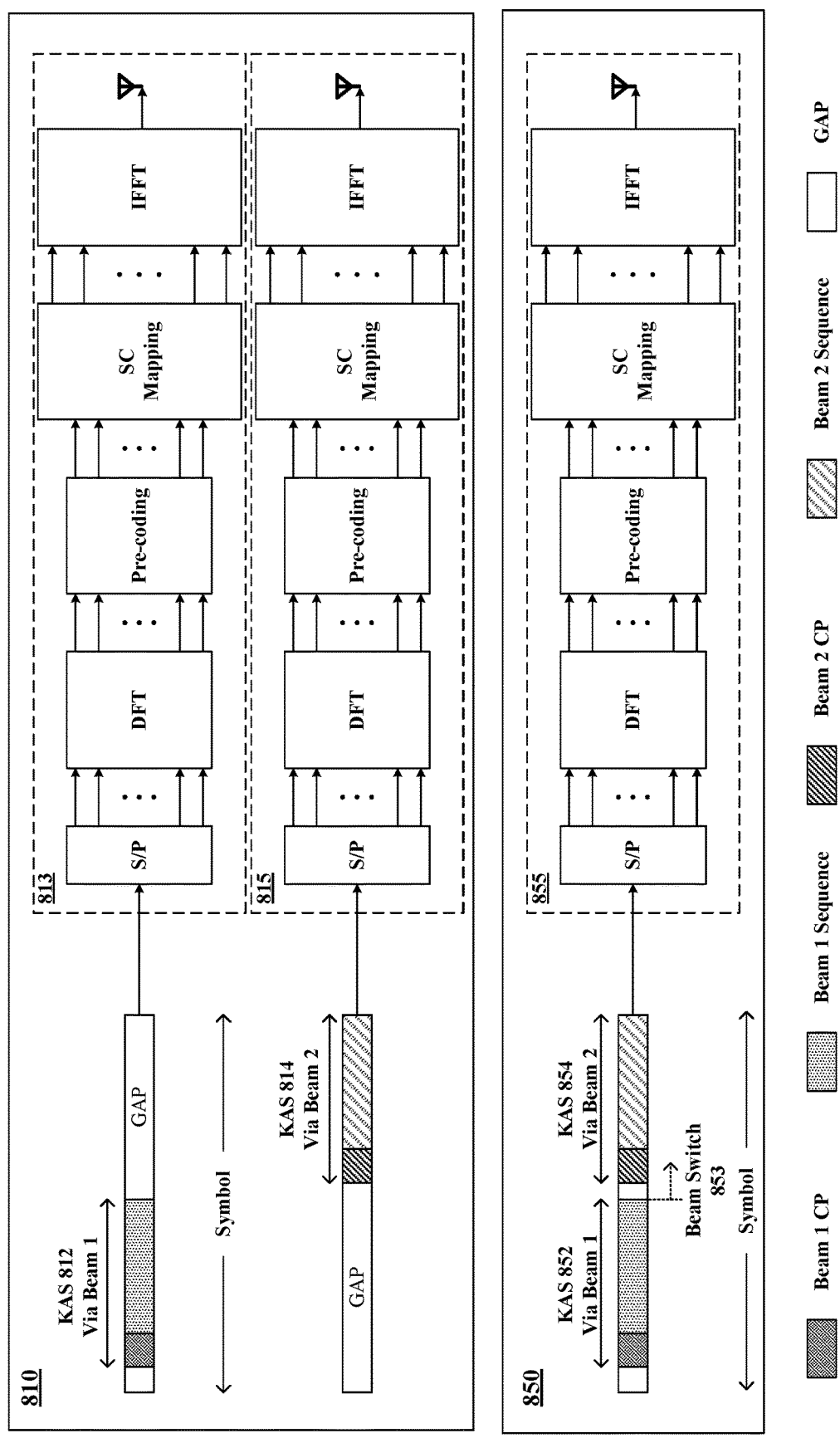
FIG. 8 illustrates methods of generating sub-symbol discovery signals for a same slot in accordance with some embodiments.

FIG. 8 illustrates methods of generating one or more sub-symbol discovery signals for a same slot in accordance with some embodiments. For example, FIG. 8 includes a first diagram 810 illustrating a method of generating the one or more discovery signal transmissions by generating the first discovery signal (e.g., KAS 812) for transmission by the first beam ("beam 1") and generating the second discovery signal (e.g., KAS 814) for transmission in parallel by the second beam ("beam 2"). In some aspects, method illustrated in diagram 810 is performed by a base station that supports spatial division multiplexing (SDM). Diagram 810 of FIG. 8 further illustrates that the first beam may be associated with a first antenna, panel, or digital and/or hybrid beam forming. For example, the first sub-symbol discovery signal may be processed through a pipeline 813 including a first antenna and/or panel and the second sub-symbol discovery signal may be processed through a pipeline 815 including a second antenna and/or panel. In some aspects, the first discovery signal and the second discovery signal may be TDMed, while in some aspects, the first discovery signal and the second discovery signal may overlap in time. The first discovery signal and the second discovery signal, in some aspects, may be FDMed, while in some aspects, the first discovery signal and the second discovery signal may overlap in frequency. In some aspects, the beams may be overlapped in frequency or FDMEd before the IFFT.

A second diagram 850 illustrating a method of generating the one or more discovery signal transmissions by generating a combined transmission of the first discovery signal and the second discovery signal. The combined transmission, in some aspects, is transmitted using different beams and a gap period for a beam switch 853 may be introduced between the first sub-symbol discovery signal, KAS 852, and the second sub-symbol discovery signal, KAS 854. In some aspects, different beams may have different delay spreads, and the time gap may help to prevent an overlap between the signals of different beams. In some aspects, the first discovery signal (e.g., KAS 852) and the second discovery signal (e.g., KAS 854) are processed in a same pipeline 855. In some aspects, the first discovery signal and the second discovery signal may be TDMed and/or the first discovery signal and the second discovery signal may overlap in frequency (may be transmitted via a same frequency).

The base station 702 may transmit the SSBs/KASs 710 including the first discovery signal 710A transmitted via the first beam and the second discovery signal 710B transmitted via the second beam. Accordingly, the UE 704 may receive the discovery signals included in the SSB s/KASs 710 at 712 via the first beam and the second beam. The UE 704 may synchronize, at 714, with the base station 702 (e.g., as an example of a network node) based on a reception of the one or more discovery signal transmissions at 712.

Figure 9:
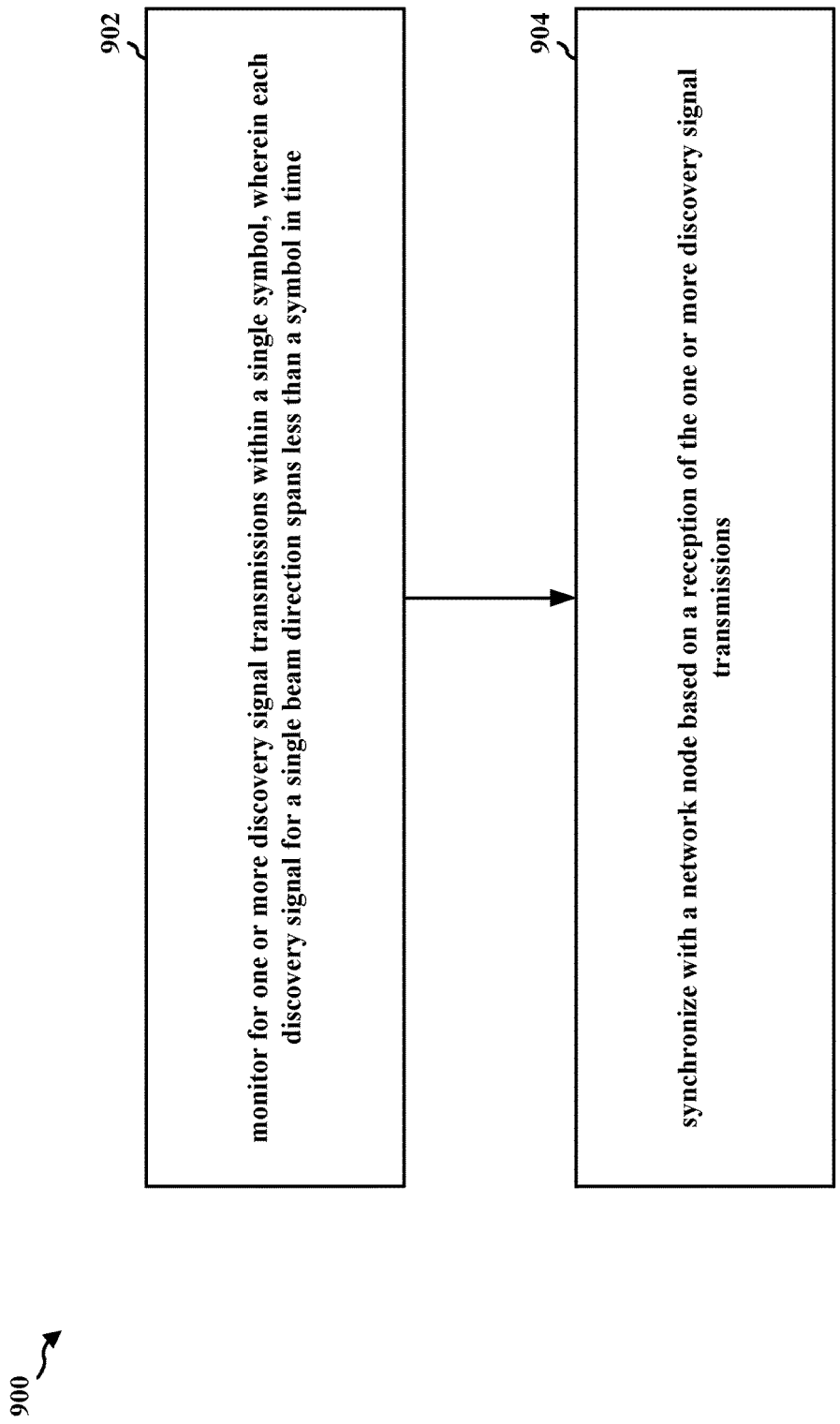
FIG. 9 is a flowchart of a method of wireless communication.

FIG. 9 is a flowchart 900 of a method of wireless communication. The method may be performed by a UE (e.g., the UE 104, or 704; the apparatus 1404). At 902, the UE may monitor for one or more discovery signal transmissions within a single symbol. For example, 902 may be performed by the transceiver 1422, the cellular baseband processor 1424, the application processor 1406, and/or the SSDSD component 198. Referring to FIG. 7, for example, the UE 704 may begin monitoring for the discovery signal at 706. In some aspects, each discovery signal for a single beam direction spans less than a symbol in time. For example, each discovery signal within the single symbol may be associated with a different beam direction and may span less than the symbol in time. The one or more discovery signals, in some aspects, may include a SSB or a KAS.

While the UE monitors for the one or more discovery signals at 902, the UE may receive a first discovery signal for a first beam (e.g., associated with a first transmission beam) in a first portion of the symbol. For example, receiving the first discovery signal may be performed by the transceiver 1422, the cellular baseband processor 1424, the application processor 1406, and/or the SSDSD component 198. Referring to FIGS. 7 and 8, for example, the UE 704 may receive the first discovery signal 710A (corresponding to KAS 812 or 852 of FIG. 8) transmitted via the first beam.

The UE may also receive a second discovery signal for a second beam (e.g., associated with a second transmission beam) in a second portion of the symbol. For example, receiving the second discovery signal may be performed by the transceiver 1422, the cellular baseband processor 1424, the application processor 1406, and/or the SSDSD component 198. Referring to FIGS. 7 and 8, for example, the UE 704 may receive the second discovery signal 710B (corresponding to KAS 814 or 854 of FIG. 8) transmitted via the second beam.

As described above in relation to FIG. 8, in some aspects, the first discovery signal may be preceded by at least one of a first cyclic prefix or a first time gap within the symbol, and the second discovery signal may be preceded by at least one of a second cyclic prefix or a second time gap in the symbol. In some aspects, the first discovery signal received by the UE is spatial division multiplexed with the second discovery signal. The first discovery signal and the second discovery signal, in some aspects, may be part of a combined transmission transmitted, e.g., the transmission illustrated in diagram 850, using different beams (e.g., a first beam during a first portion of a symbol including the first discovery signal and a second beam during a second portion of the symbol including the second discovery signal).

In some aspects, e.g., as illustrated in at least diagram 850, the first discovery signal is time division multiplexed with the second discovery signal within the symbol. The first discovery signal and the second discovery signal, in some aspects, may overlap in time within the symbol, e.g., when using SDM as in diagram 810 of FIG. 8. In some aspects, the first discovery signal is frequency division multiplexed with the second discovery signal within the symbol, while in some aspects, the first discovery signal overlaps in frequency with the second discovery signal within the symbol. At least one of the first discovery signal and the second discovery signal, in some aspects may be precoded.

At 904, the UE may synchronize with a network node based on a reception of the one or more discovery signal transmissions. For example, 904 may be performed by the cellular baseband processor 1424, the application processor 1406, and/or the SSDSD component 198. Referring to FIG. 7, for example, the UE 704 may synchronize, at 714, with the base station 702 based on a reception of the one or more discovery signal transmissions at 712

Figure 10:
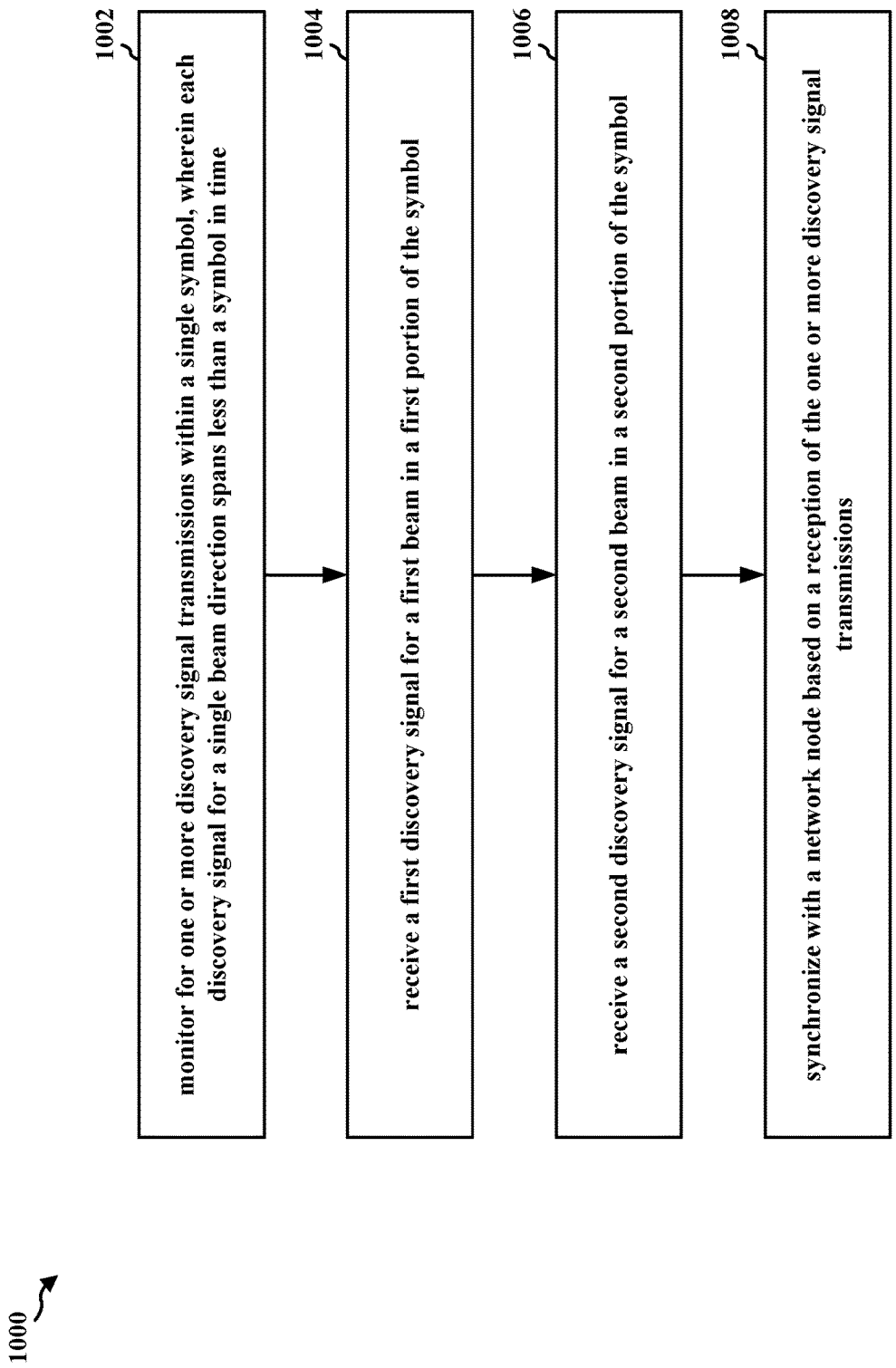
FIG. 10 is a flowchart of a method of wireless communication.

FIG. 10 is a flowchart 1000 of a method of wireless communication. The method may be performed by a UE (e.g., the UE 104, or 704; the apparatus 1404). At 902, the UE may monitor for one or more discovery signal transmissions within a single symbol. For example, 1002 may be performed by the transceiver 1422, the cellular baseband processor 1424, the application processor 1406, and/or the SSDSD component 198. Referring to FIG. 7, for example, the UE 704 may begin monitoring for the discovery signal at 706. In some aspects, each discovery signal for a single beam direction spans less than a symbol in time. For example, each discovery signal within the single symbol may be associated with a different beam direction and may span less than the symbol in time. The one or more discovery signals, in some aspects, may include a SSB or a KAS.

While the UE monitors for the one or more discovery signals at 1002, the UE may receive, at 1004, a first discovery signal for a first beam (e.g., associated with a first transmission beam) in a first portion of the symbol. For example, 1004 may be performed by the transceiver 1422, the cellular baseband processor 1424, the application processor 1406, and/or the SSDSD component 198. Referring to FIGS. 7 and 8, for example, the UE 704 may receive the first discovery signal 710A (corresponding to KAS 812 or 852 of FIG. 8) transmitted via the first beam.

The UE may also receive, at 1006, a second discovery signal for a second beam (e.g., associated with a second transmission beam) in a second portion of the symbol. For example, 1006 may be performed by the transceiver 1422, the cellular baseband processor 1424, the application processor 1406, and/or the SSDSD component 198. Referring to FIGS. 7 and 8, for example, the UE 704 may receive the second discovery signal 710B (corresponding to KAS 814 or 854 of FIG. 8) transmitted via the second beam.

As described above in relation to FIG. 8, in some aspects, the first discovery signal may be preceded by at least one of a first cyclic prefix or a first time gap within the symbol, and the second discovery signal may be preceded by at least one of a second cyclic prefix or a second time gap in the symbol. In some aspects, the first discovery signal received by the UE is spatial division multiplexed with the second discovery signal. The first discovery signal and the second discovery signal, in some aspects, may be part of a combined transmission transmitted, e.g., the transmission illustrated in diagram 850, using different beams (e.g., a first beam during a first portion of a symbol including the first discovery signal and a second beam during a second portion of the symbol including the second discovery signal).

In some aspects, e.g., as illustrated in at least diagram 850, the first discovery signal is time division multiplexed with the second discovery signal within the symbol. The first discovery signal and the second discovery signal, in some aspects, may overlap in time within the symbol, e.g., when using SDM as in diagram 810 of FIG. 8. In some aspects, the first discovery signal is frequency division multiplexed with the second discovery signal within the symbol, while in some aspects, the first discovery signal overlaps in frequency with the second discovery signal within the symbol. At least one of the first discovery signal and the second discovery signal, in some aspects may be precoded.

At 1008, the UE may synchronize with a network node based on a reception of the one or more discovery signal transmissions. For example, 1008 may be performed by the cellular baseband processor 1424, the application processor 1406, and/or the SSDSD component 198. Referring to FIG. 7, for example, the UE 704 may synchronize, at 714, with the base station 702 based on a reception of the one or more discovery signal transmissions at 712

Figure 11:
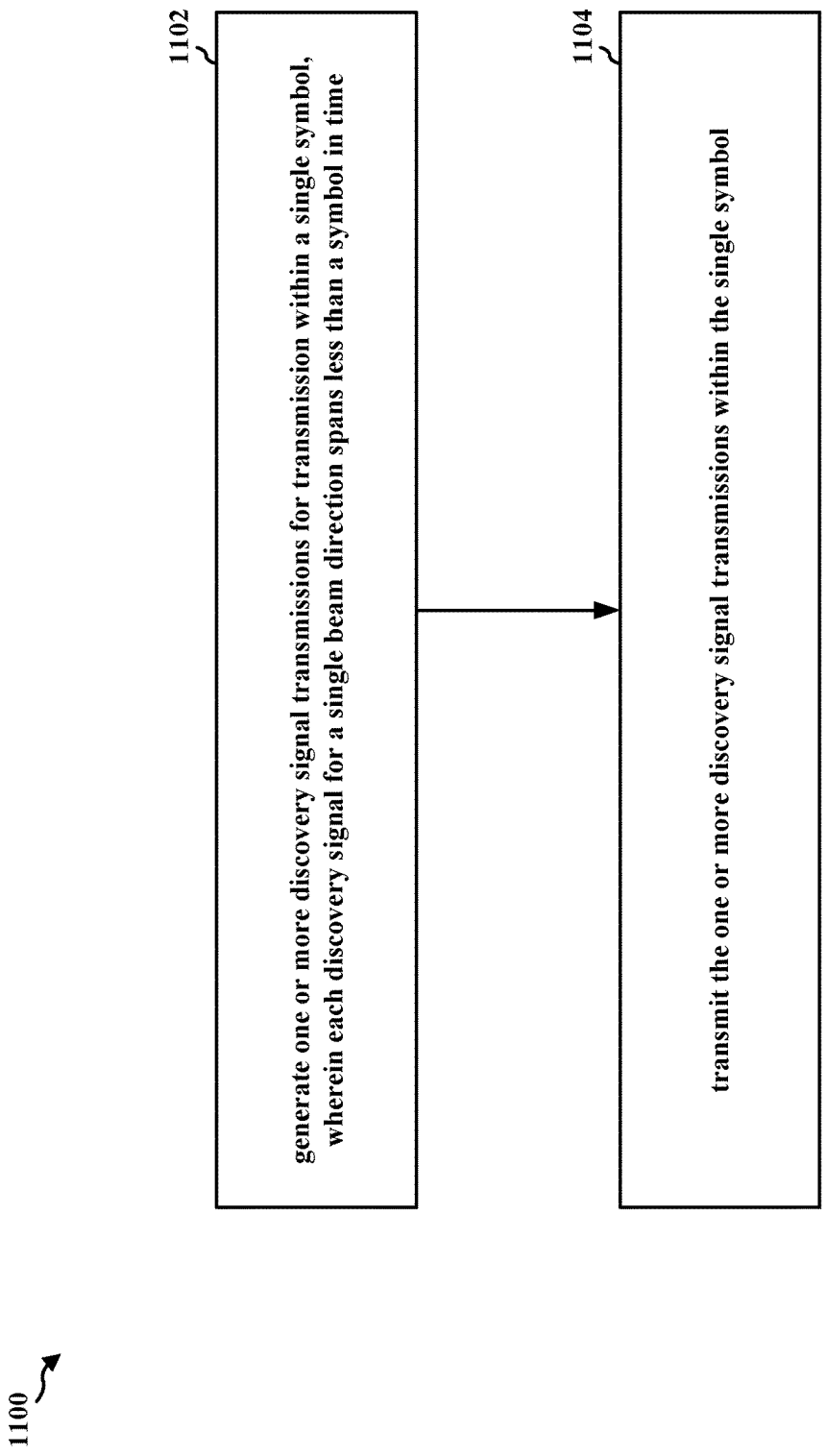
FIG. 11 is a flowchart of a method of wireless communication.

FIG. 11 is a flowchart 1100 of a method of wireless communication. The method may be performed by a base station (e.g., the base station 102 and/or 702; the network entity 1502). At 1102, the base station may generate one or more discovery signal transmissions for transmission within a single symbol. For example, 1102 may be performed by the RU processor 1542, the DU processor 1532, the CU processor 1512, and/or the SSDSD component 199. Referring to FIGS. 7 and 8, for example, the base station 702 may generate, at 708, one or more discovery signal transmissions for transmission within a single symbol. In some aspects, each discovery signal may be associated with a single (unique) beam direction and may span less than a symbol in time. The one or more discovery signal transmissions, in some aspects, include a SSB or a KAS. In some aspects, the one or more discovery signal transmissions may include a first discovery signal and a second discovery signal and generating the one or more discovery signal transmissions may include adding at least one of a first cyclic prefix or a first time gap in the symbol before the first discovery signal, and adding at least one of a second cyclic prefix or a second time gap in the symbol before the second discovery signal. In some aspects, the first cyclic prefix and the second cyclic prefix are added before a DFT is applied to the one or more discovery signals. The first cyclic prefix and the second cyclic prefix, in some aspects, are added after an IFFT to the one or more discovery signals. In some aspects, the base station may precode at least one of the first discovery signal and the second discovery signal.

For example, referring to FIG. 8, methods of generating sub-symbol discovery signals for a same slot in accordance with some embodiments is illustrated. For example, FIG. 8 includes the first diagram 810 illustrating a method of generating the one or more discovery signal transmissions by generating the first discovery signal (e.g., KAS 812) for transmission by the first beam ("beam 1") and generating the second discovery signal (e.g., KAS 814) for transmission in parallel by the second beam ("beam 2"). In some aspects, method illustrated in diagram 810 is performed by a base station that supports SDM. Diagram 810 of FIG. 8 further illustrates that the first beam may be associated with a first antenna, panel, or digital and/or hybrid beam forming. For example, the first sub-symbol discovery signal may be processed through a pipeline 813 including a first antenna and/or panel and the second sub-symbol discovery signal may be processed through a pipeline 815 including a second antenna and/or panel. In some aspects, the first discovery signal and the second discovery signal may be TDMed, while in some aspects, the first discovery signal and the second discovery signal may overlap in time. The first discovery signal and the second discovery signal, in some aspects, may be FDMed, while in some aspects, the first discovery signal and the second discovery signal may overlap in frequency. In some aspects, the beams may be overlapped in frequency or FDMEd before the IFFT.

A second diagram 850 illustrating a method of generating the one or more discovery signal transmissions by generating a combined transmission of the first discovery signal and the second discovery signal. The combined transmission, in some aspects, is transmitted using different beams and a gap period for a beam switch 853 may be introduced between the first sub-symbol discovery signal, KAS 852, and the second sub-symbol discovery signal, KAS 854. In some aspects, the first discovery signal (e.g., KAS 852) and the second discovery signal (e.g., KAS 854) are processed in a same pipeline 855. In some aspects, the first discovery signal and the second discovery signal may be TDMed and/or the first discovery signal and the second discovery signal may overlap in frequency (may be transmitted via a same frequency).

At 1104, the base station may transmit the one or more discovery signal transmissions within the single symbol. For example, 1104 may be performed by the RU processor 1542, the DU processor 1532, the CU processor 1512, the transceiver 1546, the antennas 1580, and/or the SSDSD component 199. Transmitting the one or more discovery signals, at 1104, may include transmitting a first discovery signal for a first beam in a first portion of the symbol and transmitting a second discovery signal for a second beam in a second portion of the symbol. For example, referring to FIG. 7, the base station 702 may transmit the SSBs/KASs 710 including the first discovery signal 710A transmitted via the first beam and the second discovery signal 710B transmitted via the second beam.

Figure 12:
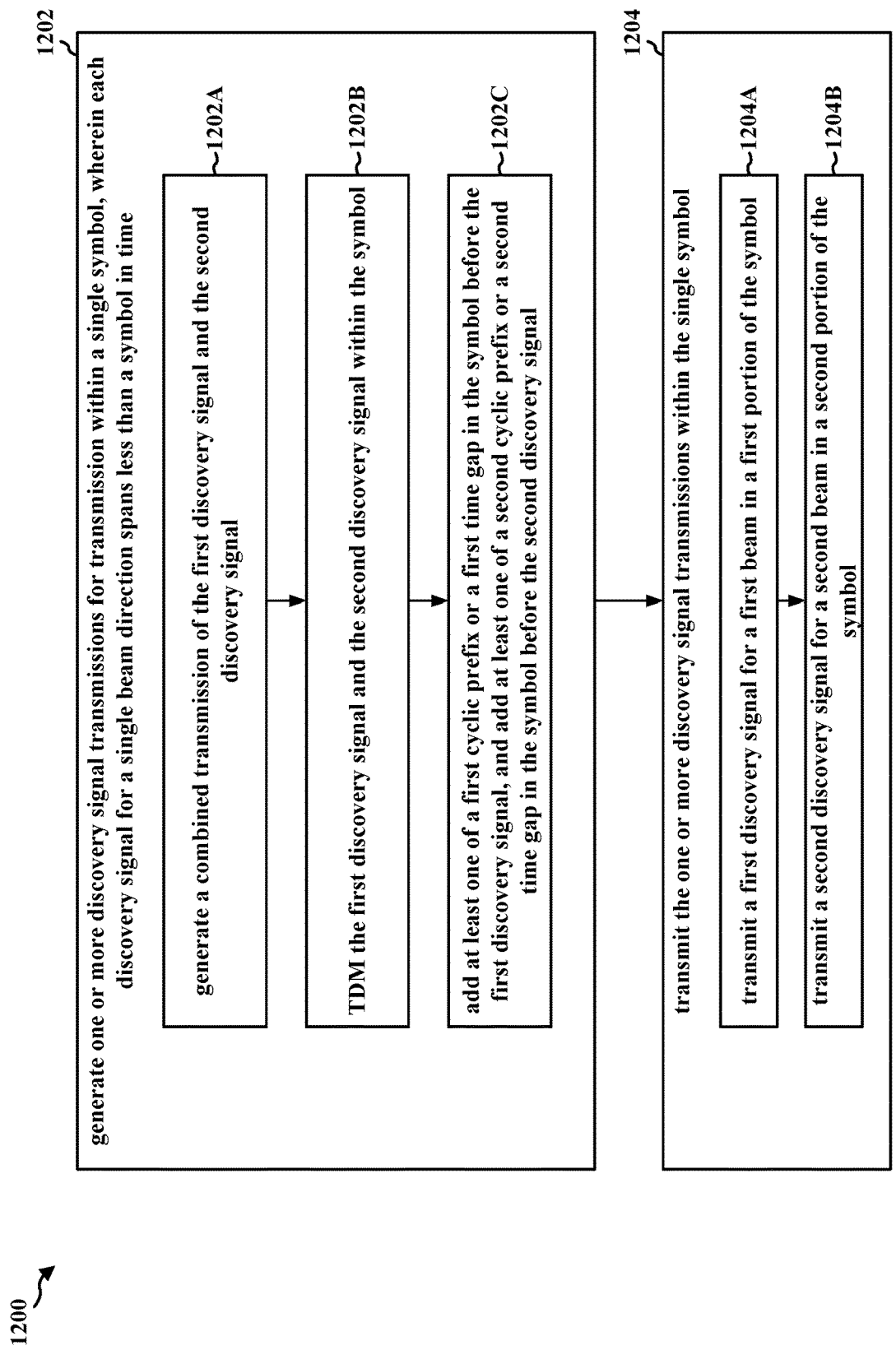
FIG. 12 is a flowchart of a method of wireless communication.

FIG. 12 is a flowchart 1200 of a method of wireless communication. The method may be performed by a base station (e.g., the base station 102 and/or 702; the network entity 1502). At 1202, the base station may generate one or more discovery signal transmissions for transmission within a single symbol. For example, 1202 may be performed by the RU processor 1542, the DU processor 1532, the CU processor 1512, and/or the SSDSD component 199. Referring to FIGS. 7 and 8, for example, the base station 702 may generate, at 708, one or more discovery signal transmissions for transmission within a single symbol. In some aspects, each discovery signal may be associated with a single (unique) beam direction and may span less than a symbol in time. The one or more discovery signal transmissions, in some aspects, include a SSB or a KAS.

In some aspects, to generate the one or more discovery signal transmissions at 1202, the base station may generate, at 1202A, a combined transmission of the first discovery signal and the second discovery signal. For example, 1202A may be performed by the RU processor 1542, the DU processor 1532, the CU processor 1512, and/or the SSDSD component 199. The base station may time division multiplex, at 1202B, the combined transmission generated at 1202A, the first discovery signal and the second discovery signal. The time division multiplexing may include allocating disjoint time resources in a same frequency band. The time division multiplexed first discovery signal and second discovery signal may be separated by a gap to allow for a beam switching between the first beam associated with the first discovery signal and the second beam associated with the second discovery signal. The base station may, at 1202C, add at least one of a first cyclic prefix or a first time gap in the symbol before the first discovery signal and add at least one of a second cyclic prefix or a second time gap in the symbol before the second discovery signal. The cyclic prefix may be added before a DFT or after an IFFT in different aspects.

Referring to FIG. 8 as an example, the combined transmission, in some aspects, may be generated for different beams and a gap period for a beam switch 853 may be introduced between the first sub-symbol discovery signal, KAS 852, and the second sub-symbol discovery signal, KAS 854. In some aspects, the first discovery signal (e.g., KAS 852) and the second discovery signal (e.g., KAS 854) are processed in a same pipeline 855. In some aspects, the first discovery signal and the second discovery signal may be TDMed and/or the first discovery signal and the second discovery signal may overlap in frequency (may be transmitted via a same frequency).

At 1204, the base station may transmit the one or more discovery signal transmissions within the single symbol. For example, 1204 may be performed by the RU processor 1542, the DU processor 1532, the CU processor 1512, the transceiver 1546, the antennas 1580, and/or the SSDSD component 199. Transmitting the one or more discovery signals, at 1204, may include transmitting a first discovery signal for a first beam in a first portion of the symbol at 1204A and transmitting a second discovery signal for a second beam in a second portion of the symbol at 1204B. For example, referring to FIG. 7, the base station 702 may transmit the SSBs/KASs 710 including the first discovery signal 710A transmitted via the first beam and the second discovery signal 710B transmitted via the second beam.

Figure 13:
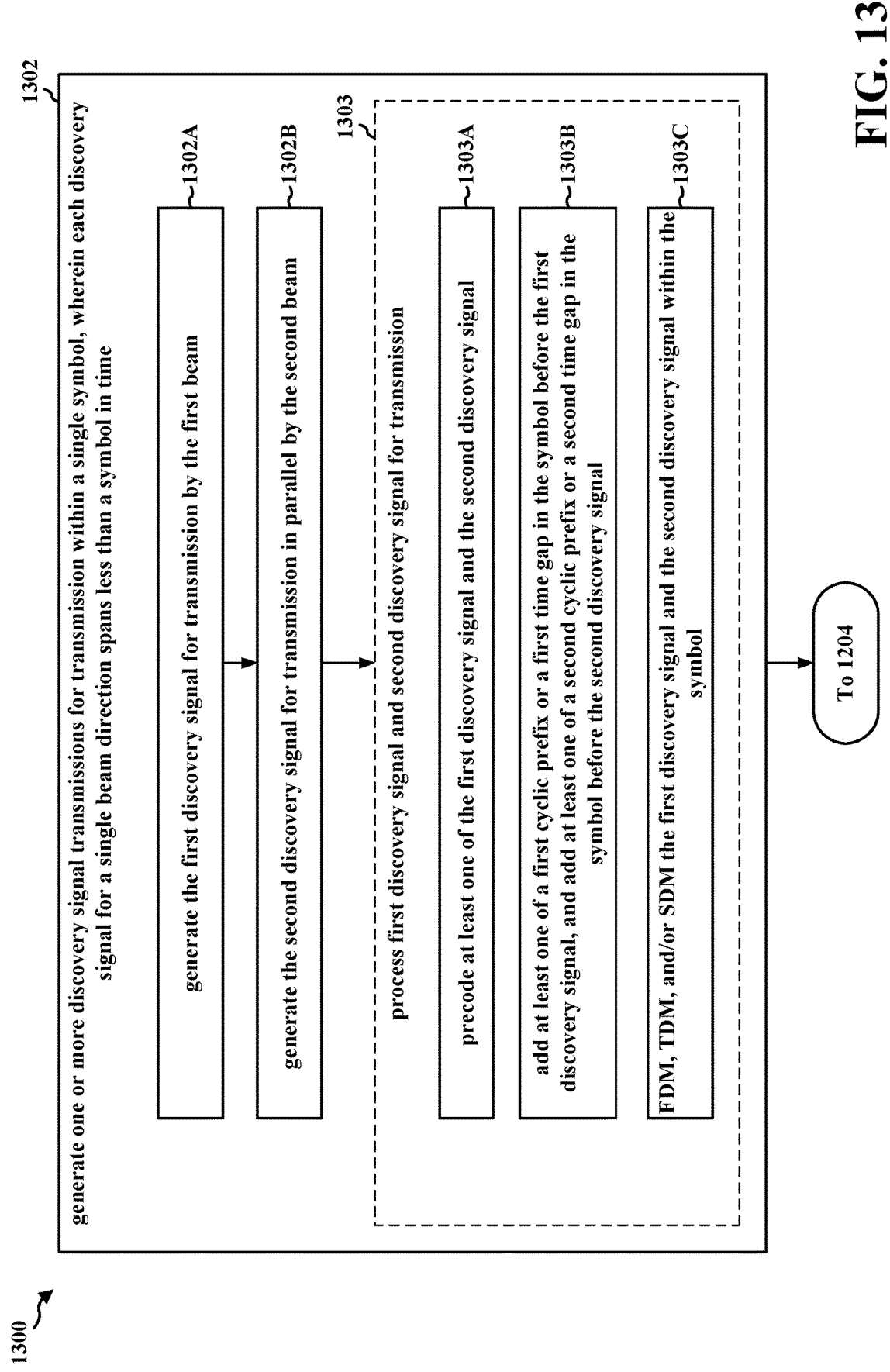
FIG. 13 is a flowchart of a method of wireless communication.

FIG. 13 is a flowchart 1300 of a method of wireless communication. The method may be performed by a base station (e.g., the base station 102 and/or 702; the network entity 1502). At 1302, the base station may generate one or more discovery signal transmissions for transmission within a single symbol. For example, 1302 may be performed by the RU processor 1542, the DU processor 1532, the CU processor 1512, and/or the SSDSD component 199. Referring to FIGS. 7 and 8, for example, the base station 702 may generate, at 708, one or more discovery signal transmissions for transmission within a single symbol. In some aspects, each discovery signal may be associated with a single (unique) beam direction and may span less than a symbol in time. The one or more discovery signal transmissions, in some aspects, include a SSB or a KAS.

In some aspects, to generate the one or more discovery signal transmissions at 1302, the base station may generate, at 1302A, a first discovery signal for transmission by the first beam. For example, referring to FIG. 8, the base station may generate the first discovery signal KAS 812. The base station may also generate, at 1302B, a second discovery signal for transmission in parallel by the second beam. For example, referring to FIG. 8, the base station may generate the second discovery signal KAS 814. The base station may then process at 1303, the generated first and second discovery signals.

To process the generated first and second discovery signals, at 1303, the base station may precode, at 1303A, at least one of the first discovery signal and the second discovery. The base station may, at 1303B, add at least one of a first cyclic prefix or a first time gap in the symbol before the first discovery signal, and add at least one of a second cyclic prefix or a second time gap in the symbol before the second discovery signal. In some aspects, adding the first or second cyclic prefix or the first or second time gap, at 1303B, may be performed one of before the DFT or after the IFFT. The base station, at 1303C, may perform one or more multiplexing operations.

For example, the base station may, at 1302A, generate a combined transmission of the first discovery signal and the second discovery signal. For example, 1302A may be performed by the RU processor 1542, the DU processor 1532, the CU processor 1512, and/or the SSDSD component 199. The base station may time division multiplex, at 1302B, the combined transmission generated at 1302A, the first discovery signal and the second discovery signal. The time division multiplexing may include allocating disjoint time resources in a same frequency band. The time division multiplexed first discovery signal and second discovery signal may be separated by a gap to allow for a beam switching between the first beam associated with the first discovery signal and the second beam associated with the second discovery signal. The base station may, at 1302C, add at least one of a first cyclic prefix or a first time gap in the symbol before the first discovery signal and add at least one of a second cyclic prefix or a second time gap in the symbol before the second discovery signal. The cyclic prefix may be added before a DFT or after an IFFT in different aspects. In some aspects, the base station supports SDM and the multiplexing operation at 1303C may be an SDM operation. In some aspects, the first discovery signal and the second discovery signal may be TDMed at 1303C, while in some aspects, the first discovery signal and the second discovery signal may overlap in time. The first discovery signal and the second discovery signal, in some aspects, may be FDMed at 1303C, while in some aspects, the first discovery signal and the second discovery signal may overlap in frequency. In some aspects, the beams may be overlapped in frequency or FDMEd before the IFFT.

For example, FIG. 8 includes the first diagram 810 illustrating a method of generating the one or more discovery signal transmissions by generating the first discovery signal (e.g., KAS 812) for transmission by the first beam ("beam 1") and generating the second discovery signal (e.g., KAS 814) for transmission in parallel by the second beam ("beam 2"). In some aspects, method illustrated in diagram 810 is performed by a base station that supports SDM. Diagram 810 of FIG. 8 further illustrates that the first beam may be associated with a first antenna, panel, or digital and/or hybrid beam forming. For example, the first sub-symbol discovery signal may be processed through a pipeline 813 including a first antenna and/or panel and the second sub-symbol discovery signal may be processed through a pipeline 815 including a second antenna and/or panel. In some aspects, the first discovery signal and the second discovery signal may be TDMed, while in some aspects, the first discovery signal and the second discovery signal may overlap in time. The first discovery signal and the second discovery signal, in some aspects, may be FDMed, while in some aspects, the first discovery signal and the second discovery signal may overlap in frequency. In some aspects, the beams may be overlapped in frequency or FDMEd before the IFFT.

The base station may then proceed to transmit the one or more discovery signal transmissions within the single symbol as described in relation to 1204 of FIG. 12.

Figure 14:
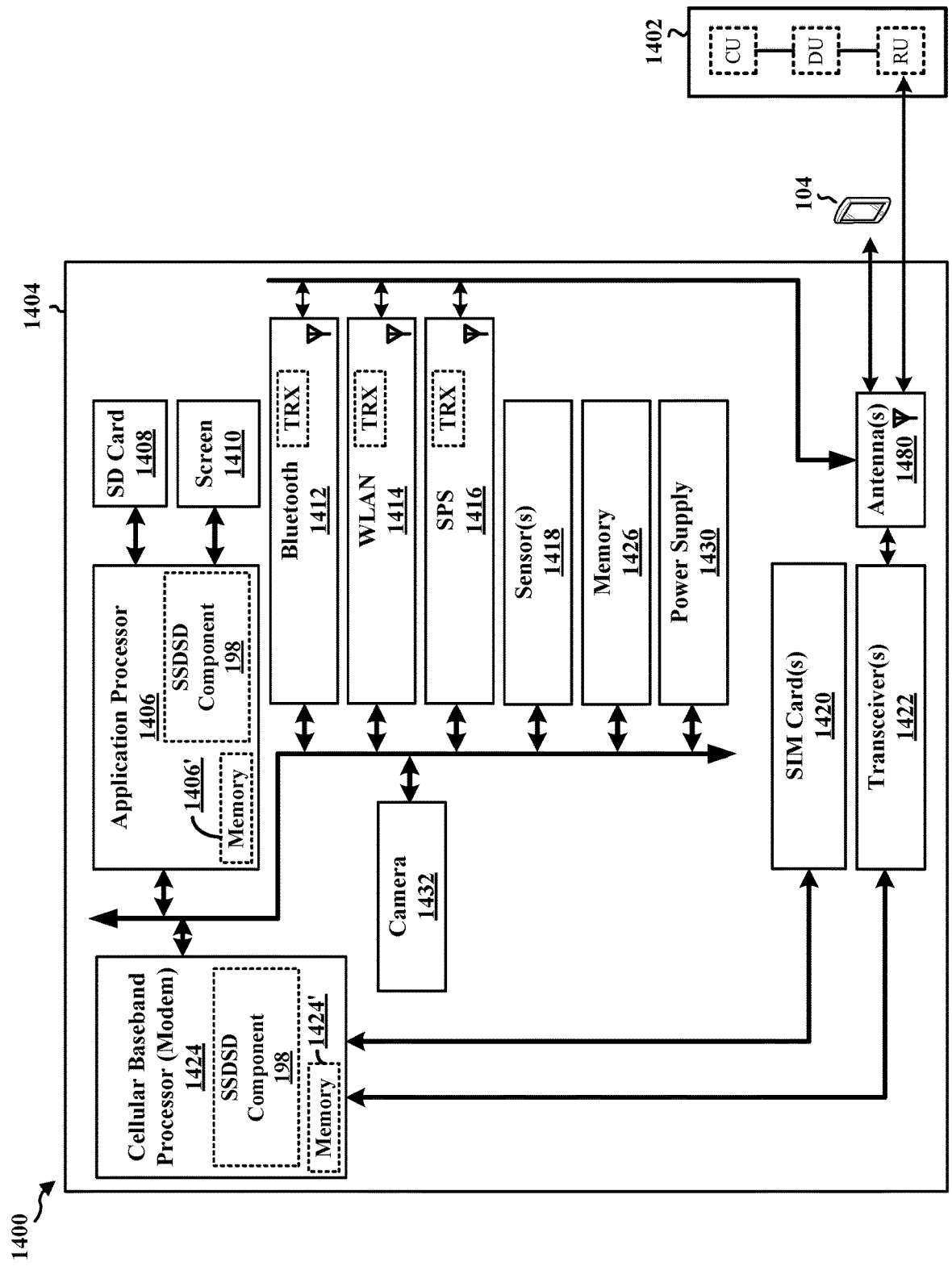
FIG. 14 is a diagram illustrating an example of a hardware implementation for an apparatus.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the SSDSD component 198 is configured to monitor for one or more discovery signal transmissions within a single symbol, where each discovery signal for a single beam direction spans less than a symbol in time and to synchronize with a network node based on a reception of the one or more discovery signal transmissions. The SSDSD component 198 may be within the cellular baseband processor 1424, the application processor 1406, or both the cellular baseband processor 1424 and the application processor 1406. The SSDSD component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for monitoring for one or more discovery signal transmissions within a single symbol; means for synchronizing with a network node based on a reception of the one or more discovery signal transmissions; means for receiving a first discovery signal for a first beam in a first portion of the symbol; means for receiving a second discovery signal for a second beam in a second portion of the symbol. The means may be the SSDSD component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
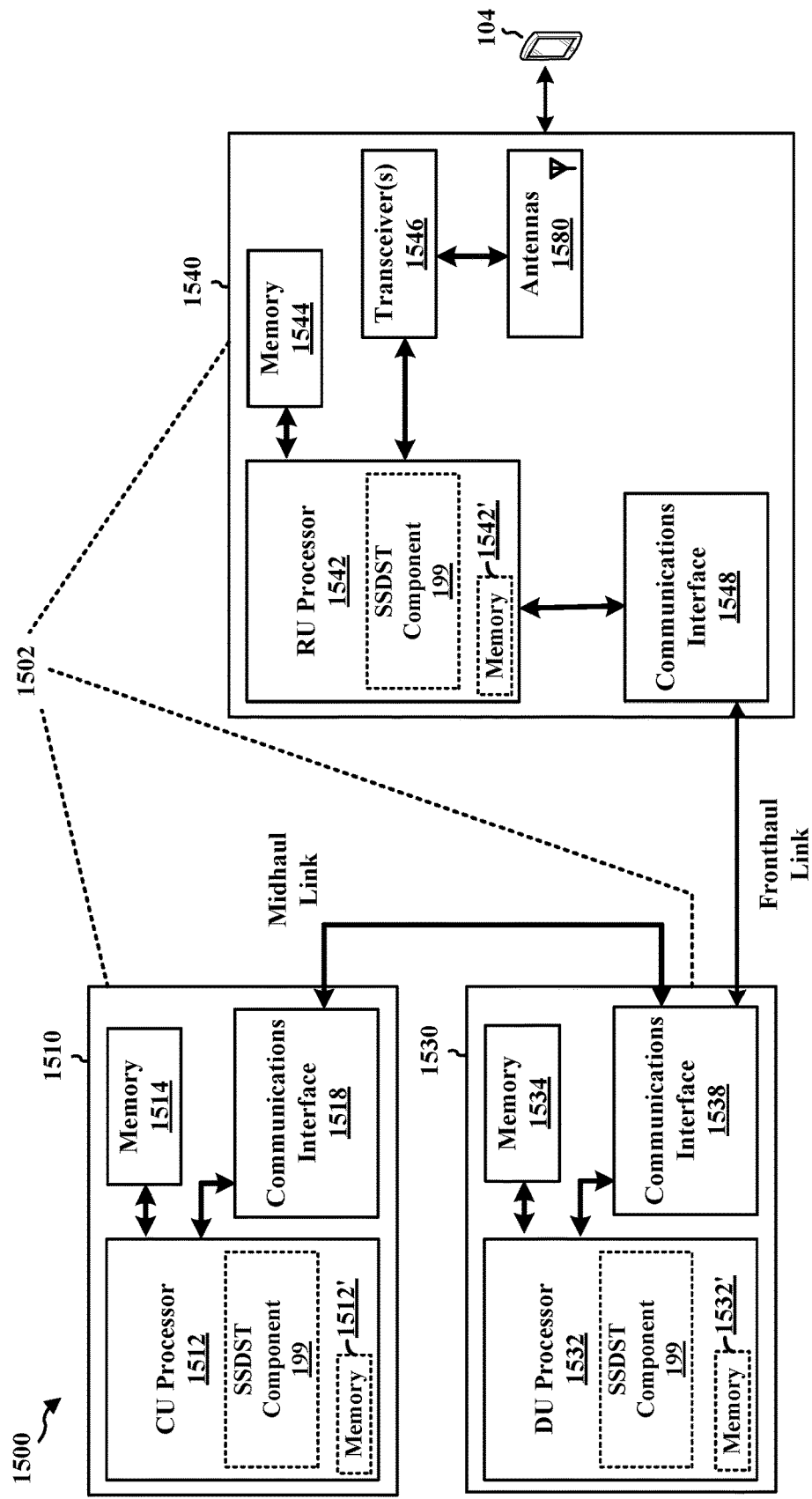
FIG. 15 is a diagram illustrating an example of a hardware implementation for a network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SSDST component 199 is configured to generate one or more discovery signal transmissions for transmission within a single symbol, wherein each discovery signal for a single beam direction spans less than a symbol in time, and to transmit the one or more discovery signal transmissions within the single symbol. The SSDST component 199 may be within one or more processors of one or more of the CU 1510, DU 1530, and the RU 1540. The SSDST component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for generating one or more discovery signal transmissions for transmission within a single symbol; means for generating the first discovery signal for transmission by the first beam; means for generating the second discovery signal for transmission in parallel by the second beam; means for generating a combined transmission of the first discovery signal and the second discovery signal; means for time division multiplexing the first discovery signal and the second discovery signal within the symbol; means for frequency division multiplexing the first discovery signal and the second discovery signal within the symbol; means for precoding at least one of the first discovery signal and the second discovery signal; means for adding at least one of a first cyclic prefix or a first time gap in the symbol before the first discovery signal; means for adding at least one of a second cyclic prefix or a second time gap in the symbol before the second discovery signal; means for transmitting the one or more discovery signal transmissions within the single symbol; means for transmitting a first discovery signal for a first beam in a first portion of the symbol; and means for transmitting a second discovery signal for a second beam in a second portion of the symbol. The means may be the SSDST component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Some aspects of wireless communication use one or more SSBs for initial cell search. In some aspects, an SSB may include or span 4 symbols with 1 symbol for PSS, 2 symbols for PBCH, and 1 symbol with FDM'ed SSS and PBCH. The PSS, in some aspects, uses a length 127 frequency domain-based M-sequence (e.g., mapped to 127 sub-carriers (SCs)) with one of three possible sequences while the SSS may use a length 127 frequency domain-based Gold Code sequence (e.g., 2 M-sequences mapped to 127 SCs) with one of 1008 possible sequences. In some aspects, PBCH is QPSK modulated can be coherently demodulated using an associated DMRS. In some aspects, the SCS associated with the SSB may be one of 15 kHz, 30 kHz, 120 kHz, 240 kHz, 480, kHz, or 960 kHz.

In some aspects, different beams associated with different SSB indexes may be used by different numbers of devices. Additionally, a threshold number of devices that may be defined for switching from a standard (e.g., four-symbol) SSB to a simpler discovery signal, e.g., a keep alive signal (KAS), or set of discovery signals. For example, a first SSB and unused portions may span a first frequency range and occupy a first set of four symbols. In some aspects, a first KAS may represent a transmission of the first SSB using a larger SCS (e.g., using 480 kHz SCS instead of 120 kHz SCS) such that the number of symbols is maintained, but the time required is reduced and the full bandwidth, or nearly the full bandwidth, is utilized. While switching SCS may provide some overhead reduction, in some aspects, it introduces additional complexity. For example, additional complexity associated with an initial search may be introduced for a connecting device, a cell coverage may be reduced due to the reduced time available for a CP, and/or a beam switching gap may not be absorbed in a CP due to a short CP.

In order to reduce overhead, without introducing increased complexity, the first SSB, in some aspects, may be replaced by one or more simpler discovery signals. For example, the first SSB may be replaced by one or more first KASs or a set of a first KAS and a second KAS. The simpler discovery signals may be implemented in some aspects as described above. For example, simpler discovery signals spanning sub-symbol time spans may be multiplexed, e.g., SDMed, TDMed, and or FDMed within a single symbol.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including monitoring for one or more discovery signal transmissions within a single symbol, where each discovery signal for a single beam direction spans less than a symbol in time, and synchronizing with a network node based on a reception of the one or more discovery signal transmissions.

Aspect 2 is the method of aspect 1, where the one or more discovery signal transmissions include a SSB or a KAS.

Aspect 3 is the method of any of aspects 1 and 2, further including receiving a first discovery signal for a first beam in a first portion of the symbol, and receiving a second discovery signal for a second beam in a second portion of the symbol.

Aspect 4 is the method of aspect 3, where the first discovery signal is preceded by at least one of a first cyclic prefix or a first time gap within the symbol, and the second discovery signal is preceded by at least one of a second cyclic prefix or a second time gap in the symbol.

Aspect 5 is the method of aspect 4, where the first discovery signal received by the UE is spatial division multiplexed with the second discovery signal.

Aspect 6 is the method of aspect 4, where the first discovery signal and the second discovery signal are part of a combined transmission that is transmitted using different beams.

Aspect 7 is the method of any of aspects 3 to 6, where the first discovery signal is time division multiplexed with the second discovery signal within the symbol.

Aspect 8 is the method of any of aspects 3 to 5, where the first discovery signal and the second discovery signal overlap in time within the symbol.

Aspect 9 is the method of any of aspects 3 to 8, where the first discovery signal is frequency division multiplexed with the second discovery signal within the symbol Aspect 10 is the method of any of aspects 3 to 8, where the first discovery signal overlaps in frequency with the second discovery signal within the symbol.

Aspect 11 is the method of any of aspects 3 to 5 and 7 to 10, where at least one of the first discovery signal and the second discovery signal is precoded.

Aspect 12 is a method of wireless communication at a network node, including generating one or more discovery signal transmissions for transmission within a single symbol, where each discovery signal for a single beam direction spans less than a symbol in time, and transmitting the one or more discovery signal transmissions within the single symbol.

Aspect 13 is the method of aspect 12, where the one or more discovery signal transmissions include a SSB or a KAS.

Aspect 14 is the method of any of aspects 12 and 13, where transmitting the one or more discovery signal includes: transmitting a first discovery signal for a first beam in a first portion of the symbol, and transmitting a second discovery signal for a second beam in a second portion of the symbol.

Aspect 15 is the method of aspect 14, further including adding at least one of a first cyclic prefix or a first time gap in the symbol before the first discovery signal, and adding at least one of a second cyclic prefix or a second time gap in the symbol before the second discovery signal.

Aspect 16 is the method of aspect 15, where the first cyclic prefix and the second cyclic prefix are added before a DFT is applied to the one or more discovery signals.

Aspect 17 is the method of aspect 15, where the first cyclic prefix and the second cyclic prefix are added after an IFFT to the one or more discovery signals.

Aspect 18 is the method of any of aspects 14-17, where, generating the one or more discovery signal transmissions includes: generating the first discovery signal for transmission by the first beam, and generating the second discovery signal for transmission in parallel by the second beam, where the first discovery is spatial division multiplexed with the second discovery signal.

Aspect 19 is the method of any of aspects 14-17, where generating the one or more discovery signal transmissions includes generating a combined transmission of the first discovery signal and the second discovery signal, the combined transmission being transmitted using different beams.

Aspect 20 is the method of any of aspects 14 to 19, further including time division multiplexing the first discovery signal and the second discovery signal within the symbol.

Aspect 21 is the method of any of aspects 14 to 18, where the first discovery signal and the second discovery signal overlap in time within the symbol.

Aspect 22 is the method of any of aspects 14 to 18, 20, and 21, further including frequency division multiplexing the first discovery signal and the second discovery signal within the symbol.

Aspect 23 is the method of any of aspects 14 to 22, wherein the first discovery signal overlaps in frequency with the second discovery signal within the symbol.

Aspect 24 is the method of any of aspects 14 to 18 and 20-23, where the first discovery signal and the second discovery signal are part of a combined transmission that is transmitted using different beams.

What is claimed is:

1. An apparatus for wireless communication at a user equipment (UE), comprising:
    a memory; and
    at least one processor coupled to the memory and, based at least in part on information stored in the memory, the at least one processor is configured to:
        monitor for one or more discovery signal transmissions within a single symbol, wherein each discovery signal for a single beam direction spans less than a symbol in time; and
        receive a first discovery signal for a first beam in a first portion of the symbol, wherein the first discovery signal is preceded by at least one of a first cyclic prefix or a first time gap in the symbol;
        receive a second discovery signal for a second beam in a second portion of the symbol, wherein the second discovery signal is preceded by at least one of a second cyclic prefix or a second time gap in the symbol; and
        synchronize with a network node based on a reception of the one or more discovery signal transmissions.

2. The apparatus of claim 1, wherein the one or more discovery signal transmissions include a synchronization signal block (SSB) or a keep alive signal (KAS).

3. The apparatus of claim 1, wherein the first discovery signal received by the UE is spatial division multiplexed with the second discovery signal.

4. The apparatus of claim 1, wherein the first discovery signal and the second discovery signal are part of a combined transmission that is transmitted using different beams.

5. The apparatus of claim 1, wherein the first discovery signal is time division multiplexed with the second discovery signal within the symbol.

6. The apparatus of claim 1, wherein the first discovery signal and the second discovery signal overlap in time within the symbol.

7. The apparatus of claim 1, wherein the first discovery signal is frequency division multiplexed with the second discovery signal within the symbol.

8. The apparatus of claim 1, wherein the first discovery signal overlaps in frequency with the second discovery signal within the symbol.

9. The apparatus of claim 1, wherein at least one of the first discovery signal and the second discovery signal is precoded.

10. An apparatus for wireless communication at a network node, comprising:
    a memory; and
    at least one processor coupled to the memory and, based at least in part on information stored in the memory, the at least one processor is configured to:
        generate one or more discovery signal transmissions for transmission within a single symbol, wherein each discovery signal for a single beam direction spans less than a symbol in time, at least one of a first cyclic prefix or a first time gap is included in the symbol before a first discovery signal, and at least one of a second cyclic prefix or a second time gap is included in the symbol before a second discovery signal; and
        transmit the one or more discovery signal transmissions within the single symbol, wherein the first discovery signal is transmitted on a first beam in a first portion of the symbol and the second discovery signal in transmitted on a second beam in a second portion of the symbol.

11. The apparatus of claim 10, wherein the one or more discovery signal transmissions include a synchronization signal block (SSB) or a keep alive signal (KAS).

12. The apparatus of claim 10, wherein the first cyclic prefix and the second cyclic prefix are added before a discrete Fourier transform (DFT) is applied to the one or more discovery signal transmissions.

13. The apparatus of claim 10, wherein the first cyclic prefix and the second cyclic prefix are added after an inverse fast Fourier transform (IFFT) to the one or more discovery signal transmissions.

14. The apparatus of claim 10, wherein, to generate the one or more discovery signal transmissions, the at least one processor is configured to:
    generate the first discovery signal for transmission by the first beam; and
    generate the second discovery signal for transmission in parallel by the second beam, wherein the first discovery signal is spatial division multiplexed with the second discovery signal.

15. The apparatus of claim 10, wherein, to generate the one or more discovery signal transmissions, the at least one processor is configured to:
    generate a combined transmission of the first discovery signal and the second discovery signal, wherein the combined transmission is transmitted using different beams.

16. The apparatus of claim 10, the at least one processor further configured to:
    time division multiplex the first discovery signal and the second discovery signal within the symbol.

17. The apparatus of claim 10, wherein the first discovery signal and the second discovery signal overlap in time within the symbol.

18. The apparatus of claim 10, the at least one processor further configured to:
frequency division multiplex the first discovery signal and the second discovery signal within the symbol.

19. The apparatus of claim 10, wherein the first discovery signal overlaps in frequency with the second discovery signal within the symbol.

20. The apparatus of claim 10, the at least one processor further configured to:
precode at least one of the first discovery signal and the second discovery signal.

21. A method of wireless communication at a user equipment (UE), including:
monitoring for one or more discovery signal transmissions within a single symbol, wherein each discovery signal for a single beam direction spans less than a symbol in time;
receiving a first discovery signal for a first beam in a first portion of the symbol, wherein the first discovery signal is preceded by at least one of a first cyclic prefix or a first time gap in the symbol;
receiving a second discovery signal for a second beam in a second portion of the symbol, wherein the second discovery signal is preceded by at least one of a second cyclic prefix or a second time gap in the symbol; and
synchronizing with a network node based on a reception of the one or more discovery signal transmissions.

22. The method of claim 21, wherein the one or more discovery signal transmissions include a synchronization signal block (SSB) or a keep alive signal (KAS).

23. The method of claim 21, wherein the first discovery signal and the second discovery signal are one or more of time division multiplexed, spatial division multiplexed, or frequency division multiplexed.

24. A method of wireless communication at a network node, including:
generating one or more discovery signal transmissions for transmission within a single symbol, wherein each discovery signal for a single beam direction spans less than a symbol in time, at least one of a first cyclic prefix or a first time gap is included in the symbol before a first discovery signal, and at least one of a second cyclic prefix or a second time gap is included in the symbol before a second discovery signal; and
transmitting the one or more discovery signal transmissions within the single symbol, wherein the first discovery signal is transmitted on a first beam in a first portion of the symbol and the second discovery signal is transmitted on a second beam in a second portion of the symbol.

25. The method of claim 24, wherein the one or more discovery signal transmissions include a synchronization signal block (SSB) or a keep alive signal (KAS).

26. The method of claim 24, further comprising one or more of:
time division multiplexing the first discovery signal and the second discovery signal;
spatial division multiplexing the first discovery signal and the second discovery signal; or
frequency division multiplexing the first discovery signal and the second discovery signal.

* * * * *